(12) United States Patent
Gibbs et al.

(10) Patent No.: US 8,395,044 B2
(45) Date of Patent: Mar. 12, 2013

(54) CABLE ASSEMBLY WITH PROTECTOR, AND ACCOMPANYING METHOD

(75) Inventors: Irving Albert Gibbs, Mills River, NC (US); Paul Mulligan, Yorkville, IL (US); Richard B. Ravenell, Greenville, SC (US); Thomas A. Farr, Candler, NC (US)

(73) Assignee: Eaton Corporation, Cleveland, OH (US)

( * ) Notice: Subject to any disclaimer, the term of this patent is extended or adjusted under 35 U.S.C. 154(b) by 346 days.

(21) Appl. No.: 12/795,275

(22) Filed: Jun. 7, 2010

(65) Prior Publication Data

US 2011/0297440 A1    Dec. 8, 2011

(51) Int. Cl.
    *H01B 7/00*    (2006.01)
(52) U.S. Cl. .......................................... 174/36
(58) Field of Classification Search .......... 174/47, 174/68, 70.1; 439/271, 462, 589
    See application file for complete search history.

(56) References Cited

U.S. PATENT DOCUMENTS

| | | | |
|---|---|---|---|
| 3,621,447 A * | 11/1971 | Taylor et al. | 439/204 |
| 4,469,392 A * | 9/1984 | Edgerton et al. | 439/190 |
| 5,192,948 A * | 3/1993 | Troyer et al. | 340/855.1 |
| 5,199,100 A * | 3/1993 | Maas et al. | 385/139 |
| 5,793,916 A | 8/1998 | Dahringer et al. | |
| 7,040,909 B2 * | 5/2006 | Cairns | 439/271 |
| 2005/0037656 A1 | 2/2005 | Cairns | |

FOREIGN PATENT DOCUMENTS

| | | | |
|---|---|---|---|
| FR | 2883107 A1 * | 9/2006 | |
| GB | 482061 A | 3/1938 | |

OTHER PUBLICATIONS

European Patent Office, "extended European search report", Sep. 29, 2011, 5 pp.

\* cited by examiner

*Primary Examiner* — William H Mayo, III
(74) *Attorney, Agent, or Firm* — Eckert Seamans Cherin & Mellott, LLC; Brij K. Agarwal

(57) ABSTRACT

An improved cable assembly includes at least a first elongated signal-carrying cable and a protector that has an elongated covering apparatus that is connected with the signal-carrying cable. The covering apparatus has a resilient portion having a number of corrugations. The signal-carrying cable is received within the covering apparatus, and the resilient portion is moved from a free state to a collapsed state. The signal-carrying cable and the covering apparatus are received at least partially in an uncured quantity of potting compound, and the compound is then permitted to cure.

15 Claims, 3 Drawing Sheets

CABLE ASSEMBLY WITH PROTECTOR, AND ACCOMPANYING METHOD

BACKGROUND

1. Field

The disclosed and claimed concept relates generally to cables and, more particularly, to a cable assembly having a protector that protects the cable during use with a potting compound.

2. Description of the Related Art

Numerous types of potting compounds are generally known for use in conjunction with electrical and electronic equipment. A potting compound typically is a silicone or polyurethane substance that is initially in a liquid state and which cures into a semi-solid state. An electrical assembly that has been fully mechanically assembled may typically be filled with such a potting compound in order to enable the electrical assembly to resist shock and vibration and to exclude moisture and corrosive agents. The use of such potting compounds has not, however, been without limitation.

One shortcoming with the use of potting compounds relates to the physical characteristics of the potting compound. For instance, some potting compounds can undergo thermal expansion when heated during normal use. In applications where large amounts of potting material, such as several cubic feet of potting material, are employed to fill a large electrical assembly, the amount of thermal expansion can be significant. Moreover, cured potting compound is not necessarily rigid and may be prone to vibration and jiggling in certain circumstances. Such vibration and jiggling can be significant in applications where large amounts of potting compound are used to fill an electrical assembly.

The effects from such thermal expansion, vibration, and jiggling can loosen or break certain connections within the potted electrical assembly. By way of example, fiber optic connections are particularly prone to failure in large electronic assemblies that use large amounts of potting compound. It thus would be desirable to overcome these and other shortcomings associated with the use of large quantities of potting compound in electronic assemblies.

SUMMARY

Accordingly, an improved cable assembly and associated method of disposing the cable assembly in a quantity of potting compound overcome these and other shortcomings known in the art. An improved cable assembly includes at least a first elongated signal-carrying cable and a protector that comprises an elongated covering apparatus that is connected with the signal-carrying cable. The covering apparatus comprises a resilient portion having a number of corrugations and is movable between a free state and a collapsed state. The signal-carrying cable is received within the covering apparatus, and the resilient portion is moved from its free state to its collapsed state. A clip may be provided between the signal-carrying cable and the covering apparatus to retain the resilient portion in its compressed state. The signal-carrying cable and the covering apparatus are received at least partially in an uncured quantity of potting compound, and the compound is then permitted to cure.

Accordingly, an aspect of the disclosed and claimed concept is to cause the resilient portion to be in a collapsed, i.e., compressed state after the quantity of potting compound has cured in order to apply a residual compression force on an electrical plug of a signal-carrying cable that is connected with an electronic component of an electrical assembly to maintain the connection between the plug and the electronic component.

Another aspect of the disclosed and claimed concept is to resist the thermal expansion and vibration aspects that exist in association with the use of potting compounds.

Accordingly, an aspect of the disclosed and claimed concept is to provide an improved cable assembly that is structured to be situated at least partially within a quantity of potting compound. The general nature of the cable assembly can be generally stated as including at least a first elongated signal-carrying cable, and a protector comprising an elongated covering apparatus that is connected with the at least first signal-carrying cable. The covering apparatus can be generally stated as including a resilient portion having a number of corrugations, with at least a portion of the at least first signal-carrying cable being disposed within the covering apparatus.

Another aspect of the disclosed and claimed concept is to provide an improved protector that is structured to receive therein at least a portion of at least a first elongated signal-carrying cable and to be situated at least partially within a quantity of potting compound. The general nature of the protector can be stated as including an elongated covering apparatus that includes a resilient portion having a number of corrugations, with the covering apparatus being structured to be connected with the at least first signal-carrying cable.

Another aspect of the disclosed and claimed concept is to provide an improved method of disposing at least a first elongated signal-carrying cable within a quantity of potting compound. The general nature of the method can be stated as including receiving at least a portion of the at least first signal-carrying cable within a protector that includes an elongated covering apparatus to connect together the covering apparatus and the at least first signal-carrying cable. The covering apparatus can be generally stated as including a resilient portion having a number of corrugations. The method can be stated as further including moving the resilient portion from a free state to a collapsed state, situating at least a portion of the at least first signal-carrying cable and at least a portion of the covering apparatus in an uncured quantity of potting compound, and curing the uncured quantity of potting compound.

BRIEF DESCRIPTION OF THE DRAWINGS

A further understanding of the disclosed and claimed concept can be gained from the following Description of the Preferred Embodiment when read in conjunction with the accompanying drawings in which:

Similar numerals refer to similar parts throughout the specification.

DESCRIPTION OF THE PREFERRED EMBODIMENT

Figure 1:
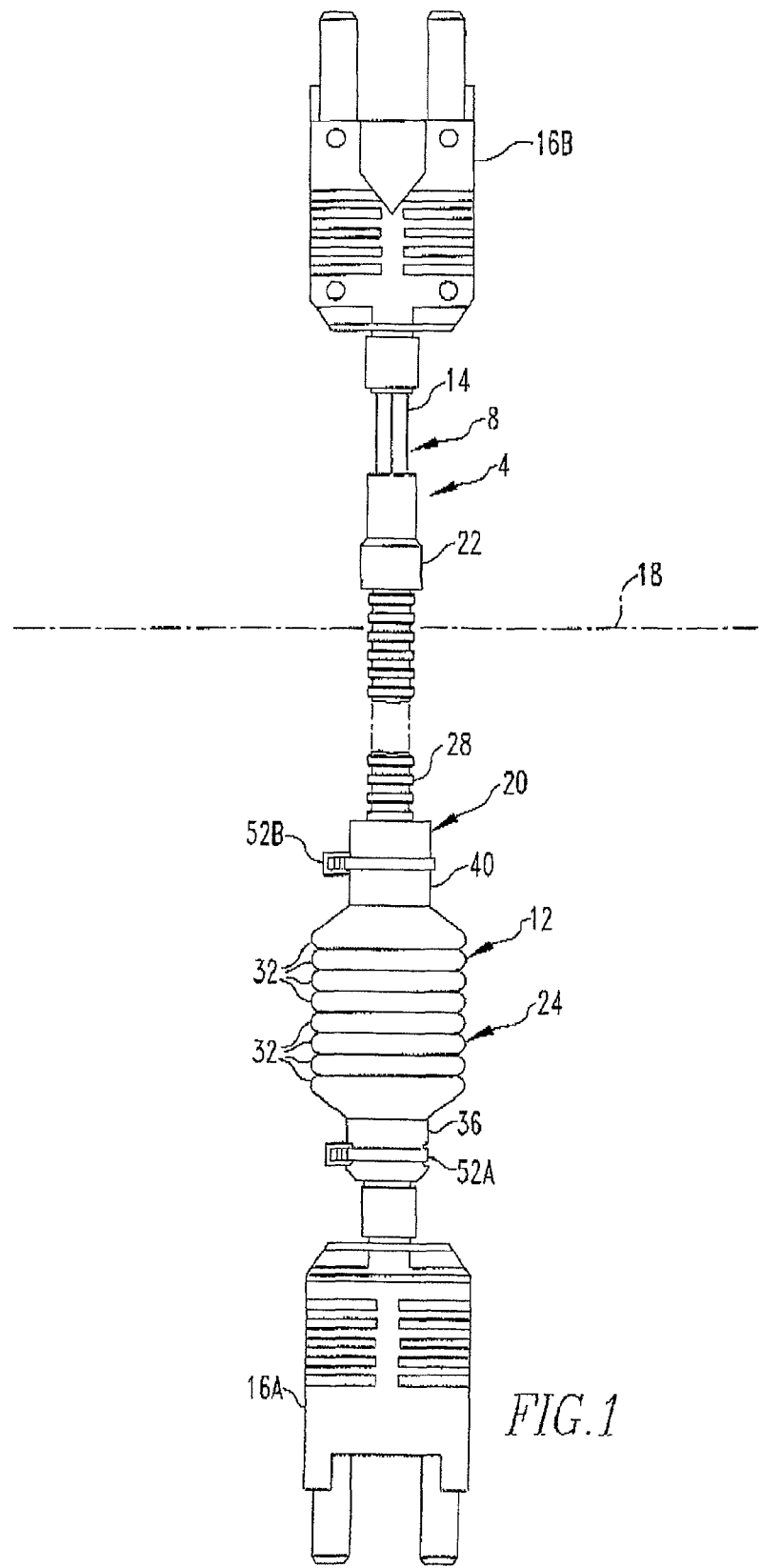
FIG. 1 is a front elevational view of an improved cable assembly in accordance with the disclosed and claimed concept.

An improved cable assembly 4 in accordance with the disclosed and claimed concept is depicted generally in FIG. 1.

The cable assembly 4 includes a signal-carrying cable 8 and a protector 12, with at least a portion of the signal-carrying cable 8 being disposed within an interior region of the protector 12. The signal-carrying cable 8 includes a cable 14 connected with a plug 16A at one end and connected with another plug 16B at another end. The signal-carrying cable 8 may be used to transmit fiber optic signals, electrical signals, or other signals without departing from the present concept. The plug 16A is structured to be connected with an electronic component of an electrical assembly. More particularly, the plug 16A is structured to be connected with an electronic component that is situated within a quantity of potting compound that is schematically depicted as lying generally below a line indicated at the numeral 18 in FIG. 1. The plug 16B is structured to be connected with another electronic component that may or may not be disposed within the potting compound.

The protector 12 can be generally stated as comprising an elongated covering apparatus 20 and a clip 22. The covering apparatus 20 comprises a resilient portion 24 and a tubular element 28 that are connected together. The resilient portion 24 is formed from a resilient material such as a synthetic rubber, which in the exemplary embodiment is EPDM, or may be formed of another such material that is resilient in nature. As employed herein, the expression "resilient" and variations thereof shall refer generally to the property of returning to an original form or position after being bent, compressed, or stretched.

Figure 3:
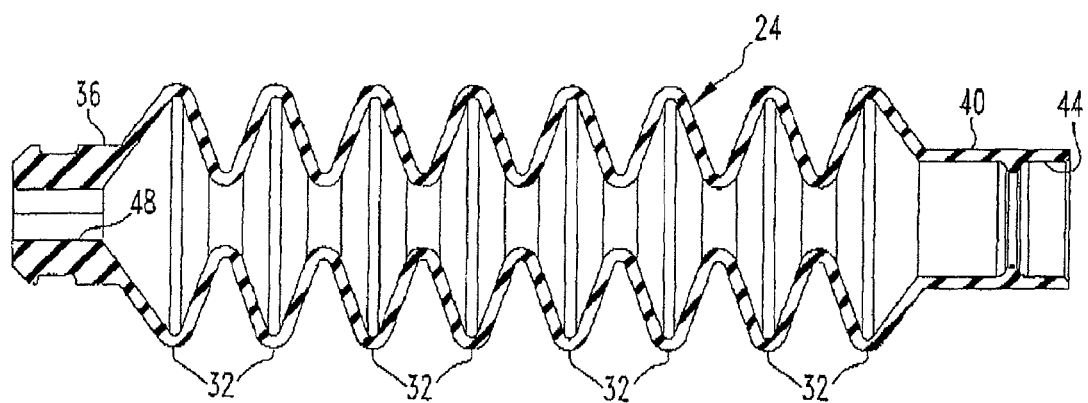
FIG. 3 is a sectional view as taken along line 3-3 of FIG. 2.

The resilient portion 24 can be said to comprise a number of corrugations 32 disposed between a protrusion 36 and a connector 40. As employed herein, the expression "a number of" and variations thereof shall refer generally to any non-zero quantity, include a quantity of one. The corrugations 32 enable the resilient portion 24 to be movable between a free state, such as is indicated generally in FIG. 3, and a collapsed state, such as is indicated generally in FIG. 1.

Figure 2:
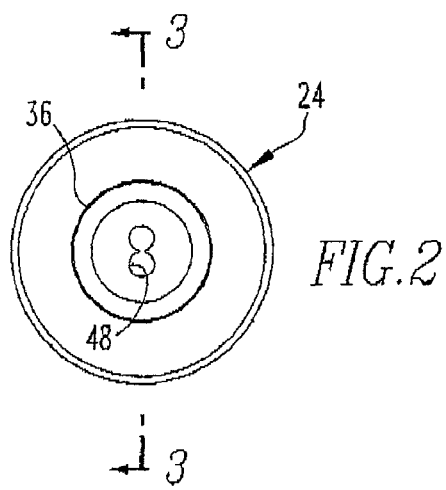
FIG. 2 is an end view of a resilient portion of the cable assembly.

The connector 40 includes a receptacle 44 within which is received an end of the tubular element 28. The tubular element 28 is an elongated hollow tube formed from a rigid but flexible plastic compound and which has the cable 14 disposed therein. The protrusion 36 is formed to have a passage 48 that extends therethrough and through which the cable 14 passes. The exemplary cable 14 is a dual-strand fiber optic cable in the exemplary embodiment presented herein, and the passage 48 thus is shaped as is indicated generally in FIGS. 2 and 3 to receive the cable 14 therethrough.

Most typically, the improved cable assembly 4 is assembled by receiving an end of the tubular element 28 in the receptacle 44 and attaching a clamp 52B about an exterior surface of the connector 42 to securely connect together the connector 40 and the tubular element 28. A length of the cable 14 is then received through the interior of the tubular element 28, through the interior of the corrugations 32, and through the passage 48. Another clamp 52A is attached to an exterior surface of the protrusion 36 to securely connect together the protrusion 36 and the cable 14. The plugs 16A and 16B are then connected to the ends of the cable 14.

It is noted that when the clamps 52A and 52B are situated on the resilient portion 24, the cable 14 becomes effectively affixed to the protrusion 36 through the passage 48 to form a fluid-resistant connection between the cable 14 and the passage 48. Similarly, when the clamp 52B is received on the exterior surface of the connector 40, a fluid-resistant connection is formed between the tubular element 28 and the receptacle 44. It is noted, however, that the cable 14 is still slidable through the tubular element 28 in the vicinity of the connector 40 despite the existence of the clamp 52B and the fluid-resistant connection that it causes to be formed between the tubular element 28 and the receptacle 44.

In use, and typically after the cable assembly 4 has been constructed in the aforementioned fashion, the tubular element 28 is translated with respect to the cable 14 to move the corrugations 32 of the resilient portion 24 to their collapsed state. The clip 22 is then received on an end of the tubular element 28 and extends between the tubular element 28 and the cable 14. The clip 22, when installed as is indicated generally in FIG. 1, retains the resilient portion 24 in its collapsed state and also provides a fluid-resistant seal between the cable 14 and the end of the tubular element 28 where the clip 22 is situated.

Once the plug 16A is connected with an electronic component that will be encased within the potting compound and the opposite plug 16B is connected with another electronic component that may or may not be encased within the potting compound, the uncured potting compound may then be poured into the electrical apparatus that includes the electronic component and in conjunction with which the cable assembly 4 is employed. The potting compound is then permitted or caused to cure, after which the clip 22 may be removed, if desired.

It is noted that he resilient portion 24 may be moved to the collapsed state and the clip 22 installed either prior to the connection of one or both of the plugs 16A and 16B with their corresponding electronic components or can be performed after such connection has occurred without departing from the present concept. Other such operations mentioned herein can be performed other than in the order expressly set forth herein without departing from the present concept.

The clamps 52A and 52B advantageously resist the intrusion of uncured potting compound into the interior of the covering apparatus 20. The clip 22 likewise advantageously resists the entry of uncured potting compound into the covering apparatus 20. The potting compound in its cured state retains the resilient portion 24 substantially in its collapsed state which can provide a residual compressive force on the plug 16A in a direction generally toward the electronic component to which it is connected, which advantageously helps to retain the integrity of the connection. It is noted, however, that such residual compressive force is not necessarily required to enable the concept to work successfully. Even in the event of thermal expansion, vibration, and jiggling of the potting compound, individually or in combination, the resilient portion 24 in its collapsed state will provide a residual compressive force on the plug 16A to maintain the integrity of its connection with its associated electronic component. In other embodiments, the resilient portion could enclose, in whole or in part, the electronic component to which the plug 16A is connected.

Figure 4:
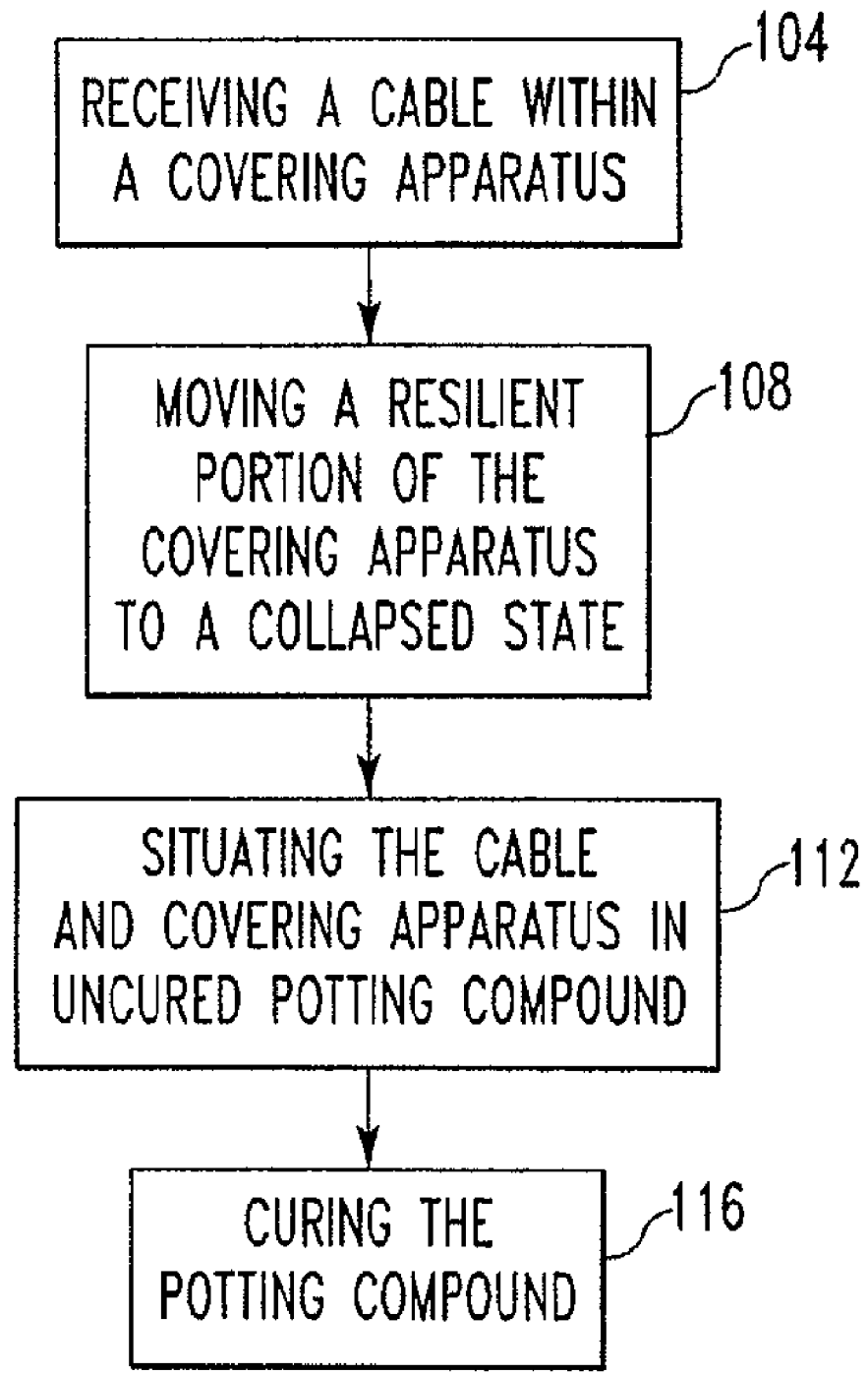
FIG. 4 is a flowchart depicting certain aspects of an improved method in accordance with the disclosed and claimed concept.

An improved method of disposing the cable assembly 4 and its signal-carrying cable 8 in a quantity of potting compound is depicted generally in FIG. 4. The signal-carrying cable 8 is received in the covering apparatus 20, as is indicated generally at 104. The resilient portion 24 is then moved to its collapsed state, as is indicated generally at 108. The signal-carrying cable 8 and the covering apparatus 20 are then situated in the uncured potting compound, as at 112. The potting compound is then permitted to cure, as at 116. As mentioned elsewhere herein, the specific order of the operations can be various without departing from the concept.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A cable assembly structured to be situated at least partially within a quantity of potting compound, the cable assembly comprising:
   at least a first elongated signal-carrying cable; and
   a protector comprising an elongated covering apparatus that is connected with the at least first signal-carrying cable, the covering apparatus comprising a resilient portion having a number of corrugations and being movable between a free state and a collapsed state, at least a portion of the at least first signal-carrying cable being disposed within the covering apparatus, the protector further comprising a clip that is structured to extend between the covering apparatus and the at least first signal-carrying cable and that is further structured to retain the resilient portion in the collapsed state.

2. The cable assembly of claim 1 wherein the covering apparatus further comprises an elongated tubular element that is connected with the resilient portion, at least a portion of the at least first signal-carrying cable being disposed within the tubular element.

3. The cable assembly of claim 2 wherein the resilient portion comprises a connector that is connected with the tubular element.

4. The cable assembly of claim 3 wherein the connector comprises a receptacle within which is received an end of the tubular element.

5. The cable assembly of claim 3 wherein at least a first corrugation from among the number of corrugations is disposed between the connector and the at least first signal-carrying cable.

6. The cable assembly of claim 1 wherein the clip extends between the tubular element and the at least first signal-carrying cable.

7. The cable assembly of claim 1 wherein the resilient portion is connected with the at least first signal-carrying cable.

8. The cable assembly of claim 1 wherein the clip is removable from between the covering apparatus and the at least first signal-carrying cable.

9. A protector structured to receive therein at least a portion of at least a first elongated signal-carrying cable and to be situated at least partially within a quantity of potting compound, the protector comprising:
   an elongated covering apparatus that comprises a resilient portion having a number of corrugations and being movable between a free state and a collapsed state; and
   a clip that is structured to extend between the covering apparatus and the at least first signal-carrying cable and being further structured to retain the resilient portion in the collapsed state.

10. The protector of claim 8 wherein the covering apparatus further comprises an elongated tubular element that is connected with the resilient portion.

11. The protector of claim 10 wherein the resilient portion comprises a connector that is connected with the tubular element.

12. The protector of claim 11 wherein the connector comprises a receptacle within which is received an end of the tubular element.

13. A method of disposing at least a first elongated signal-carrying cable within a quantity of potting compound, the method comprising:
   receiving at least a portion of the at least first signal-carrying cable within a protector that comprises an elongated covering apparatus to connect together the covering apparatus and the at least first signal-carrying cable, the covering apparatus comprising a resilient portion having a number of corrugations;
   moving the resilient portion from a free state to a collapsed state;
   situating at least a portion of the at least first signal-carrying cable and at least a portion of the covering apparatus in the collapsed state in an uncured quantity of potting compound; and
   curing the uncured quantity of potting compound.

14. The method of claim 13, further comprising applying a clip between the at least first signal-carrying cable and the covering apparatus to retain the resilient portion in the compressed state prior to the curing.

15. The method of claim 14, further comprising removing the clip from between the at least first signal-carrying cable and the covering apparatus after the curing.

* * * * *